(12) United States Patent
Zheng et al.

(10) Patent No.: US 8,717,632 B2
(45) Date of Patent: May 6, 2014

(54) IMAGE PROCESSING METHOD, IMAGE PROCESSING DEVICE AND SCANNER

(75) Inventors: Danian Zheng, Beijing (CN); Jun Sun, Beijing (CN); Satoshi Naoi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 13/471,977

(22) Filed: May 15, 2012

(65) Prior Publication Data

US 2012/0320427 A1 Dec. 20, 2012

(30) Foreign Application Priority Data

Jun. 15, 2011 (CN) .......................... 2011 1 0159927

(51) Int. Cl.
*G06T 5/00* (2006.01)
*H04N 1/407* (2006.01)
*H04N 1/409* (2006.01)

(52) U.S. Cl.
USPC .......... 358/3.26; 358/461; 358/488; 382/275; 382/190; 382/203

(58) Field of Classification Search
None
See application file for complete search history.

(56) References Cited

U.S. PATENT DOCUMENTS

2007/0206877 A1* 9/2007 Wu et al. ........................ 382/275
2010/0103474 A1* 4/2010 Oiwa et al. .................... 358/461

FOREIGN PATENT DOCUMENTS

| CN | 101789122 | 7/2010 |
|---|---|---|
| CN | 101924875 | 12/2010 |
| JP | 2010-171976 | 8/2010 |
| JP | 2011-2940 | 1/2011 |
| KR | 10-2009-0012291 | 2/2009 |
| KR | 10-2009-0108822 | 10/2009 |

OTHER PUBLICATIONS

Korean Office Action mailed Jun. 25, 2013 in corresponding Korean Application No. 10-2012-0049738.

* cited by examiner

*Primary Examiner* — Mark K Zimmerman
*Assistant Examiner* — Michael Burleson
(74) *Attorney, Agent, or Firm* — Staas & Halsey LLP

(57) ABSTRACT

An image processing method generally includes: obtaining a vanishing point on a curved surface in a two-dimension image; extracting all the straight line segments between a top contour line and a bottom contour line of the curved surface by the vanishing point; removing a perspective distortion to get parallel straight line segments; obtaining the lengths of the straight line segments, obtaining the true width of each of the straight line segments in a three-dimension space and the depth increment of the straight line segments according to the lengths; obtaining the expanded width of each straight line segment according to the true width and the depth increment; obtaining the total expanded width of the curved surface to transform it into a flat surface; transforming image contents on the curved surface onto the flat surface.

16 Claims, 6 Drawing Sheets

$dx_i = C_x/\text{length}(x_i)$
$dz_i = C_z(1/\text{length}(x_i) - 1/\text{length}(x_{i-1}))$
$ds_i = \text{sqrt}((dx_i)^2 + (dz_i)^2)$

IMAGE PROCESSING METHOD, IMAGE PROCESSING DEVICE AND SCANNER

CROSS REFERENCE TO RELATED APPLICATIONS

This application claims the benefit of Chinese Application No. 201110159927.6, filed Jun. 15, 2011, the disclosure of which is incorporated herein by reference.

FIELD

The present embodiments relate to the field of image processing and in particular to an image processing method for de-warping a captured image.

BACKGROUND

A book is typically bent due to its thickness when an image of the book is captured with a non-contact scanner or a camera, so the image captured with the scanner or the camera tends to be subject to a geometrical distortion resulting from bending. FIG. 1a illustrates an example of the image of the book scanned with the non-contact scanner, where the image is subject to the geometrical distortion resulting from bending. It may be troublesome to read contents in the book, and the use of such a distorted image for a subsequent operation may also result in poor recognition accuracy.

Numerous methods have been proposed to correct the distortion in a distorted image of a book. The traditional methods for correcting the image of a book can fall into two general categories, i.e., a content-independent correction method and a content-dependent correction method.

In a content-independent correction method, a user has a sheet of grid paper lying closely on open bent pages of a book. An image of the grid paper can be captured with a camera hovering above the pages of the book, and then a curved surface of the book can be modeled from a detected grid and a mapping relationship between the uncorrected grid and the corrected grid can be derived. With the book kept stationary, the grid paper can be removed gently, and then a page image of the book can be captured, and the bent pages of the book can be mapped to flat pages of the book according to the grid mapping relationship. A drawback of this method lies in that it may be very inconvenient for a user to lay a sheet of grid paper on pages of a book each time.

Numerous content-dependent correction methods are available based different page contents of a book, which are typically, for example, continuous line margin skeleton, words based skew correction, text line based book curve extraction, and text line ridge extraction etc. These methods have a limited scope of applications because they have an assumption that long text lines be included in the pages of the book. However no long text and even only pictures may be included in pages for many book images.

SUMMARY

In view of the foregoing problem, an embodiment provides a method for correcting a curve surface of pages of a book based upon top and bottom contour lines of the book. This method belongs to a content-independent correction method.

According to an embodiment, there is provided an image processing method including: obtaining a vanishing point on a curve surface in a two-dimension image obtained by an imaging apparatus; extracting all the straight lines between the vanishing point and the longer one of a top contour line and a bottom contour line of the curve surface by a width in a specific unit on the curve surface, the straight lines being adjacent to each other and intersecting at the vanishing point; removing a perspective distortion of the curve surface so that the intersecting straight lines become parallel straight lines; obtaining the lengths of straight line segments of the straight lines between the top contour line and the bottom contour line and obtaining the true width of each of the straight line segments in a three-dimension space and the depth increment of the straight line segment according to the lengths; obtaining the expanded width of each of the straight line segments according to the true width and the depth increment; summing the expanded widths of all the straight line segments into the total expanded width of the curve surface in order to transform the curve surface into a flat surface; and transforming image contents on the curve surface onto the flat surface according to a correspondence relationship between points on the curve surface and points on the flat surface.

According to another embodiment, there is provided an image processing device including: vanishing point obtaining means configured for obtaining a vanishing point on a curve surface in a two-dimension image obtained by an imaging apparatus; extracting means configured for extracting all the straight lines between the vanishing point and the longer one of a top contour line and a bottom contour line of the curve surface by a width in a specific unit on the curve surface, the straight lines being adjacent to each other and intersecting at the vanishing point; perspective distortion removing means configured for removing a perspective distortion of the curve surface so that the intersecting straight lines become parallel straight lines; expanded width obtaining means configured for obtaining the lengths of the straight line segments of the straight lines between the top contour line and the bottom contour line and obtaining the true widths of the respective straight line segments in a three-dimension space and the depth increments of the respective straight line segments according the lengths, for obtaining the expanded widths of the respective straight line segments according to the true widths and the depth increments, and for summing the expanded widths of all the straight line segments into the total expanded width of the curve surface in order to transform the curve surface into a flat surface; and image transforming means configured for transforming image contents on the curve surface onto the flat surface according to a correspondence relationship between points on the curve surface and points on the flat surface.

According to another embodiment, there is provided a scanner including the foregoing image processing device according to the embodiment.

According to an embodiment, there is further provided a program product with machine readable instruction codes stored thereon which when being read and executed by a machine perform the foregoing image processing method according to the embodiments.

According to an embodiment, there is further provided a storage medium with machine readable instruction codes embodied thereon which when being read and executed by a machine perform the foregoing image processing method according to the embodiment.

With the foregoing image processing technique according to the embodiments, a distortion in distorted pages of a book can be removed conveniently to facilitate smooth execution of another subsequent process, e.g., image recognition, etc., of a page image of the book.

BRIEF DESCRIPTION OF THE DRAWINGS

The foregoing and other objects, features and advantages of the embodiments will become more apparent from the detailed description given below of embodiments in conjunction with the drawings in which components are not drawn to scale but merely intended to illustrate the principle of the embodiments. For the sake of a convenient illustration and description of some aspects of the embodiments, corresponding components in the drawings may be magnified, that is, they may become larger relative to other components in an illustrative device practically manufactured according to the embodiments. In the drawings, identical or like technical features or components will be denoted with identical or like reference numerals.

DETAILED DESCRIPTION

Figure 1A:
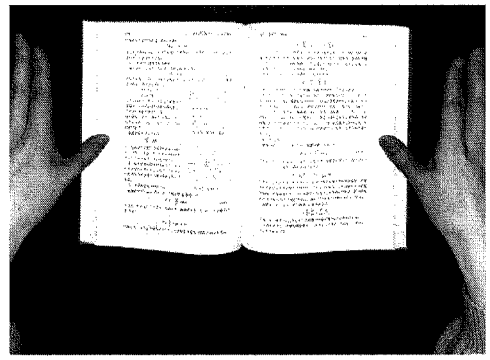
FIG. 1a and FIG. 1b illustrates an example of an image of a book scanned with a non-contact scanner and a three-dimension model thereof respectively.

The embodiments will be described below with reference to the drawings. An element and a feature described in a drawing or an embodiment can be combined with an element and a feature illustrated in one or more other drawings or embodiments. It shall be noted that a representation and a description of components and processes irrelevant to the embodiments and well known to those ordinarily skilled in the art have been omitted in the drawing and the specification for the sake of clarity.

Figure 2:
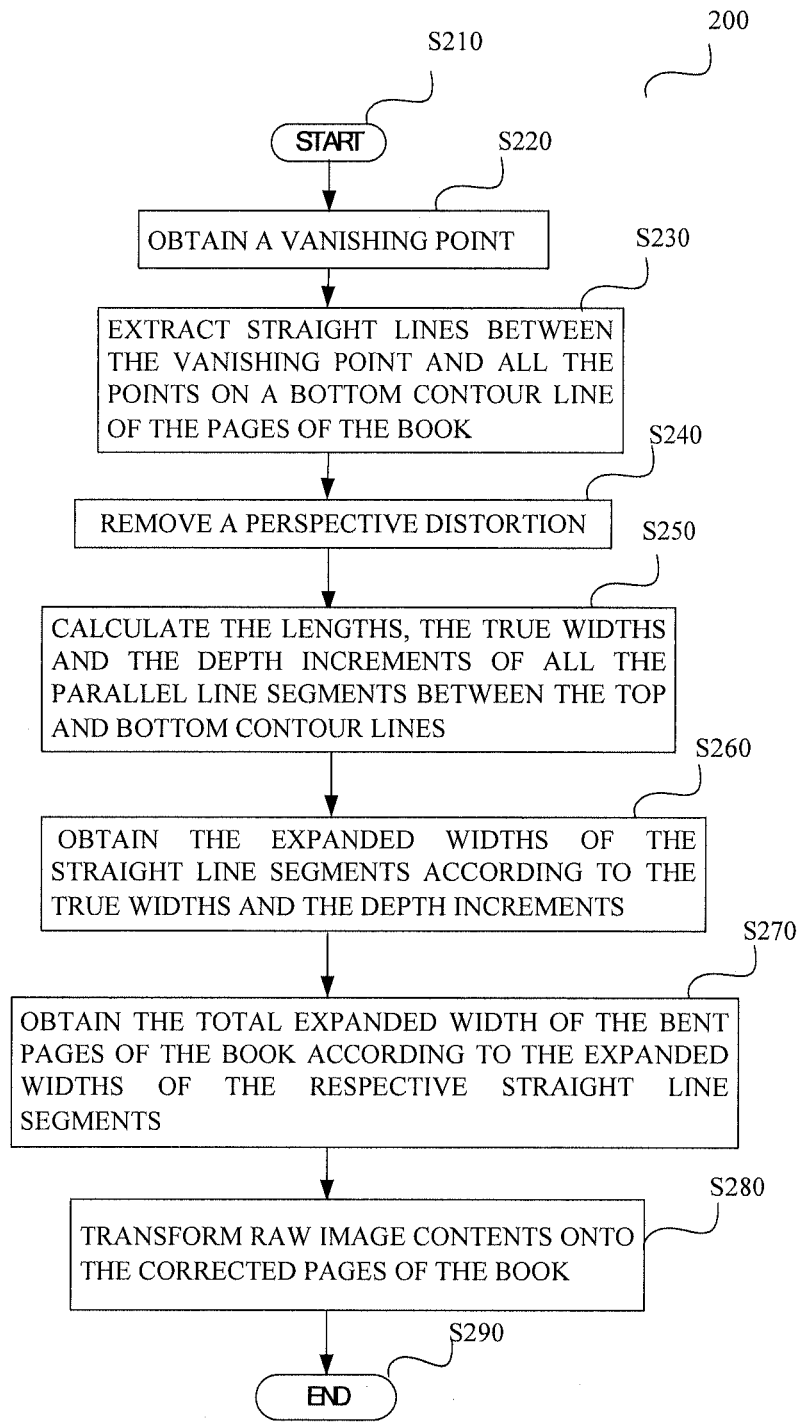
FIG. 2 is a flow chart of a process for correcting a distortion due to bent pages of a book and finally laying out contents of the pages of the book according to an embodiment.

FIG. 2 illustrates a general flow chart of an image processing method according to an embodiment. As illustrated in FIG. 2, the image processing method 200 starts with S210 and subsequently includes: obtaining a vanishing point on a curve surface in a two-dimension image obtained by an imaging apparatus (S220); extracting all the straight lines between the vanishing point and the longer one of a top contour line and a bottom contour line of the curve surface by a width in a specific unit on the curve surface, the straight lines being adjacent to each other and intersecting at the vanishing point (S230); removing a perspective distortion of the curve surface so that the intersecting straight lines become parallel straight lines (S240); obtaining the lengths of straight line segments of the straight lines between the top contour line and the bottom contour line and obtaining the true width of each of the straight line segments in a three-dimension space and the depth increment of the straight line segment according to the lengths (S250); obtaining the expanded width of each of the straight line segments according to the true width and the depth increment (S260); summing the expanded widths of all the straight line segments into the total expanded width of the curve surface in order to transform the curve surface into a flat surface (S270); and transforming image contents on the curve surface onto the flat surface according to a correspondence relationship between points on the curve surface and points on the flat surface (280). Then the process ends (S290).

A process for correcting a curve surface of pages of a book will be detailed below with reference the respective drawings as an example of the foregoing image processing method according to the embodiment.

Figure 1B:
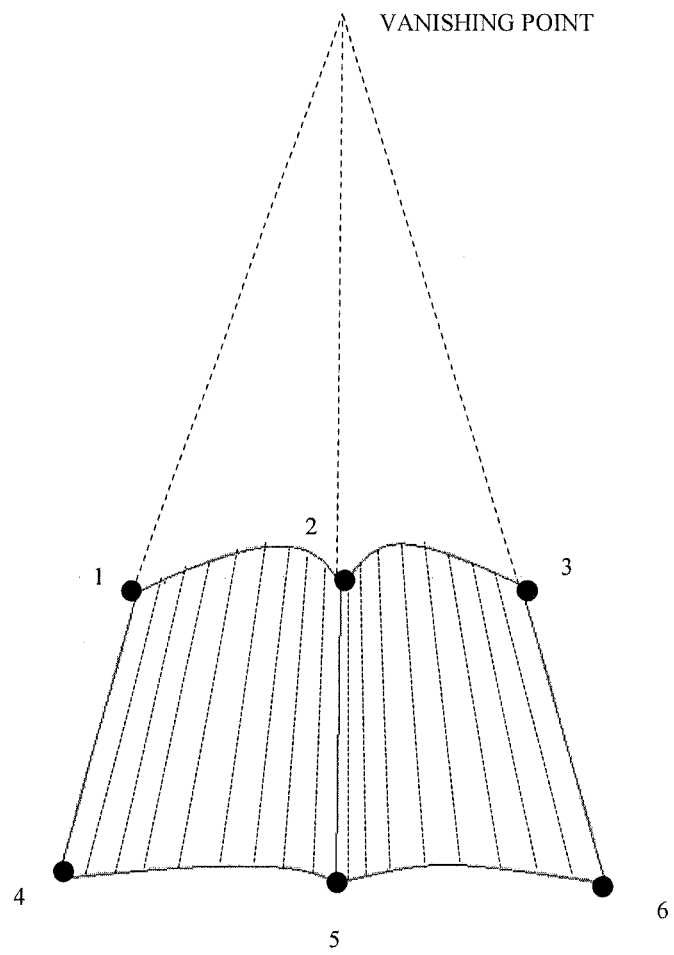

A simple three-dimension model of a curve surface of pages of a book as illustrated in FIG. 1b is utilized in the illustrative process of the embodiments. Assume that a curve surface of pages of an open book is in the shape of a cylinder composed of a large number of parallel lines in a three-dimension space. All the lines have a common intersection point in a two-dimension space of an image, i.e., a "vanishing point". As can be apparent in FIG. 1b, the curve surface of the pages of the book is subject to a geometrical distortion resulting from bending and a perspective distortion due to an angle of the imaging apparatus relative to the surface of the book.

Firstly a specific example of obtaining the vanishing point at S210 of the method 200 in FIG. 2 will be described. Referring to FIG. 1b, two pages of a book can share a vanishing point calculated from six control points of the two pages (i.e., four corner points 1, 3, 4 and 6 of the two pages of the book and two end points 2 and 5 of the central line of the book); or each of the pages of the book separately possesses a vanishing point separately calculated from four control points of that page (1, 2, 4 and 5 for the left page and 2, 3, 5 and 6 for the right page). In the case that the two pages can share a vanishing point, if the three straight lines as illustrated in FIG. 1b do not intersect at one point, then an intersection point of the three lines can be obtained in, for example, the least square method. A method for obtaining a vanishing point includes but will not be limited to obtaining a vanishing point according to control points. How to obtain a control point is known in the prior art but less irrelevant to the embodiments, and therefore a repeated description thereof will be omitted here.

Next a specific example of process of S220 in the method 200 of FIG. 2 will be described. In this illustrative example, the straight lines between the vanishing point and all the points on the bottom contour line of the pages of the book are extracted. It is assumed here that the bottom contour line is longer than the top contour line, but if the top contour line is longer, then the vanishing point will be located below the bottom contour line in FIG. 1b, and at this time the straight lines between the vanishing point and all the points on the top contour line of the pages of the book will be extracted. And these straight lines are adjacent to each other and parallel in the three-dimension image. Thus the straight line segments as required are obtained with their starting end points located on the top contour line and terminating end points located on the bottom contour line, as illustrated with the dotted lines in the pages of the book of FIG. 1b. The width of a straight line segment can be one pixel or smaller or larger than one pixel dependent upon a precision requirement in practice. Assumed here the extraction process is performed in a unit of one pixel.

At S230 of the method 200 in FIG. 2, the perspective distortion is removed to thereby transform all the intersecting line segments on the curve surface of the pages of the book into parallel line segments. Here the perspective distortion can be removed, for example, in a homography matrix. For details of how to solve the homography matrix and to remove the perspective distortion, reference can be made to "Perspective Correction Methods for Camera-Based Document Analysis" by L. Jagannathan and C. V. Jawahar in Visual Information Technology Center, International Information Technology Association, Hyderabad, India and "Multiple View Geometry in Computer Vision" by R. Hartley and A. Zisserman, published by Cambridge University Publisher, 2000. The image with the perspective distortion removed is as illustrated in FIG. 3(b). As mentioned above, if the imaging apparatus is disposed perpendicular to the flat surface in which the pages of the book are located to capture the image, then such a perspective distortion will be absent so that the step of removing the perspective distortion will be omitted.

Figure 3:
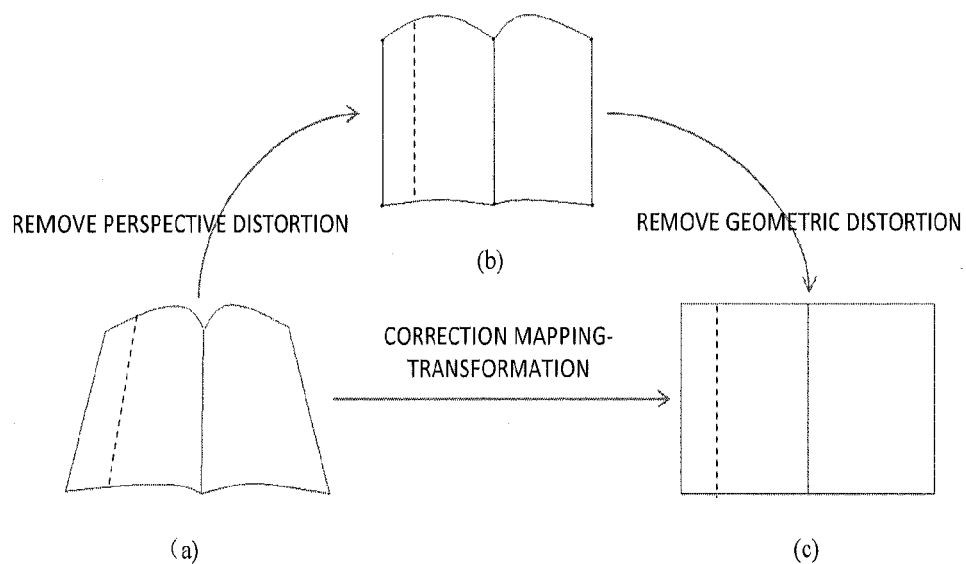
FIG. 3(a) to FIG. 3(c) illustrate schematic diagrams of three general steps in an image processing method according to an embodiment.

As illustrated in FIG. 3, the geometrical distortion is removed from the page image of the book with the perspective distortion removed.

Referring back to FIG. 2, the lengths length($x_i$) (i.e. the imaged length), the true widths $dx_i$ and the depth increments $dz_i$ of all the parallel line segments are calculated at S240 of the method 200, where i represents the index of a straight line segment and is any number ranging from 1 to m (m represents the number of straight line segments), and $x_i$ represents the abscissa of the straight line segment i. Particularly a coordinate system can be arranged as following: the abscissa is the horizontal direction and the ordinate is the vertical direction on the page image of the book illustrated in FIG. 3b, and the origin of coordinates can be arranged at a lower end point of the central line of the book or anywhere as appropriate.

Examples of obtaining the length, the true width and the depth increment will be described respectively below.

The length length($x_i$) of the straight line segment i can be obtained from the ordinates of intersection points of the straight line segment with the top and bottom contour lines as follows:

$$\text{length}(x_i) = |y_{top}(x_i) - y_{bottom}(x_i)| \quad (1)$$

The true lengths of all the straight line segments (i.e., their lengths in the three-dimension space) are the same (all the columns of a page of the book are of the same height), but the imaged lengths of the straight line segments may not be the same due to the bent pages of the book. The closer a straight line segment is to the imaging apparatus (which is a scanner in this embodiment), the longer the imaged length thereof will be. Therefore the imaged lengths of the straight line segments are inversely proportional to their distances to the imaging apparatus.

For the true width $dx_i$, the width of an extracted straight line segment is one pixel in the intermediate pages of the book in FIG. 3b (the pages of the book with the perspective distortion removed), but each line segment is observed at a different depth (the depth here is the distance from the focus of a lens to that line segment). If the pages of the book are observed at the same depth, then their projection in the horizontal direction will be observed at that time and the observed width will be referred to as the true width $dx_i$. With the same imaged width, the true width will be narrower with the shorter distance of the line segment to the imaging apparatus, or wider with the longer distance. Therefore the true width of the straight line segment is proportional to the imaging distance and inversely to the imaged length of the line segment. Then the true width of the straight line segment i is:

$$dx_i = C_x / \text{length}(x_i) \quad (2)$$

where $C_x$ represents a constant. If the true width of the longest line segment in the corrected image is defined as one pixel, i.e., $C_x$=Max(length($x_i$)), then all the true widths of the remaining line segments will be larger than one pixel. The value of $C_x$ here can be selected as required in practice or determined empirically but will not be limited to the foregoing example.

For the depth increment $dz_i$, the imaging distances of two adjacent line segments (i.e., their distances to the focus of the lens) may be different. As described above, the longer the distance of a straight line segment is to the focus of the lens, the shorter the length of the imaged line segment will be. Therefore the imaging distance of the straight line segment is inversely proportional to the imaged length of the straight line segment as follows:

$$z_i = C_z / \text{length}(x_i) \quad (3)$$

where $C_z = k * C_x$ represents a constant and k represents a constant coefficient which can be determined as required in practice, for example, from a relevant parameter of the imaging apparatus.

The difference between imaging distances is referred to as a depth increment. Hereby the depth increment of the straight line segment i is:

$$dz_i = C_z * (1/\text{length}(x_i) - 1/\text{length}(x_{i-1})) \quad (4)$$

A method for determining the depth increment will not be limited thereto. For example, the depth increment of the straight line segment i can be the difference between the distances of two sides thereof in the length direction to the focus of the lens of the imaging apparatus.

Next the expanded widths of the parallel straight line segments are calculated from the true widths $dx_i$ and the depth increments $dz_i$ at S250 of the method 200 in FIG. 2. An expanded width is the width when the book surface is expanded to be flat. A specific example of a process of calculating the expanded width $ds_i$ will be detailed below with reference to FIG. 4.

Figure 4:
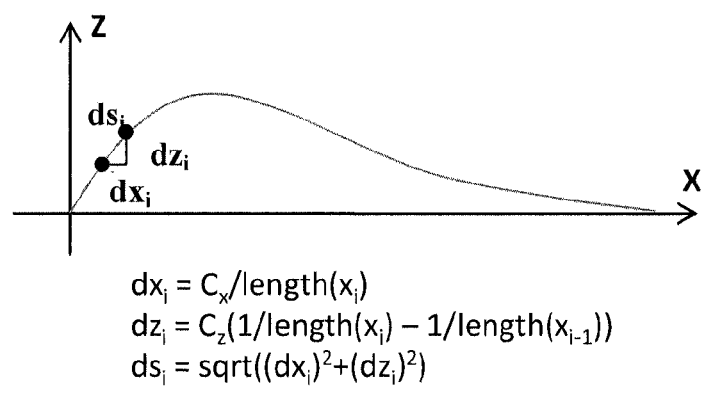
FIG. 4 is a schematic diagram of obtaining the expanded width of a straight line segment.

In FIG. 4, the x axis represents the horizontal direction as illustrated in FIG. 3(b) and the z axis represents the direction from the page image of the book to the observer as illustrated in FIG. 3(b), and the expanded width $ds_i$ of the straight line segment i constitutes together with the true width $dx_i$ and the depth increment $dz_i$ a right-angled triangle. The following equation can be derived from the Pythagorean Theorem:

$$ds_i = \sqrt{(dx_i)^2 + (dz_i)^2} \quad (5)$$

Then the total expanded width of the bent pages of the book is obtained from the expanded widths of the respective straight line segments at S260 of the method 200 in FIG. 2. The total expanded width of the bent pages of the book is equivalent to the accumulative sum of the curve surface widths of all the parallel line segments, i.e., S=sum $ds_i$ (i=1, 2, . . . m). Thus the real width of the flatted book is obtained to thereby have the surface of the book flatted, as illustrated in FIG. 3(c).

The top and bottom contour lines of the pages of the book utilized in the foregoing process can be located automatically or semi-automatically, so it is very easy for a user to handle this correction method.

Next contents on the raw pages of the book (hereinafter an input image) are transformed onto the corrected pages of the book (hereinafter an output image) at S270 of the method 200 in FIG. 2.

Figure 5:
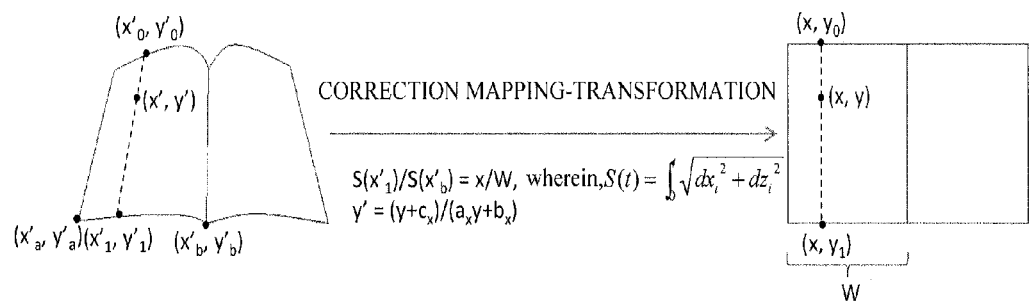
FIG. 5 is a schematic diagram of mapping-transformation when transforming contents on a raw image onto a distortion-corrected image.
Figure 6:
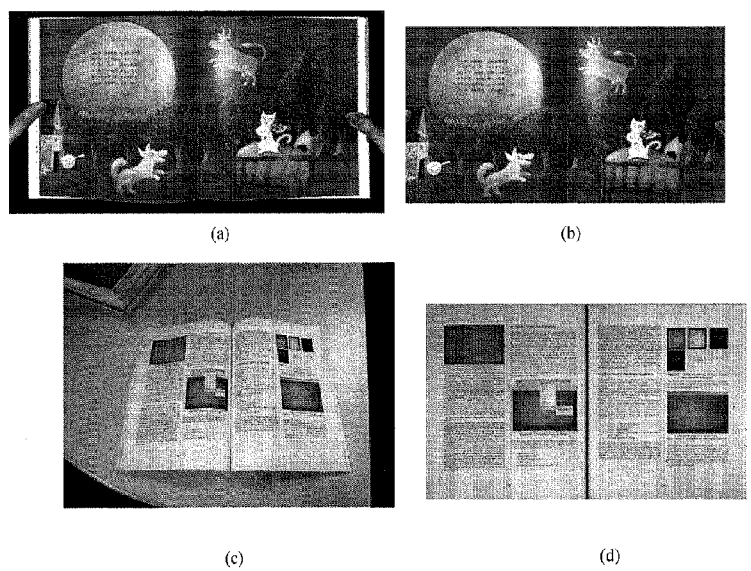
FIG. 6(a) to FIG. 6(d) are schematic diagrams illustrating a comparison between the uncorrected image and the corrected image.

A specific example of this transformation process will be detailed below with reference to FIG. 5 in which the transformation process is referred to as a "correction mapping-transformation". Firstly a corresponding vertical line segment in the input image (a line segment defined by a point ($x_0'$, $y_0'$) and a point ($x_1'$, $y_1'$)) is located for a vertical column in the output image (a straight line segment defined by a point (x, $y_0$) and a point (x, $y_1$)). Referring to FIG. 5, the following relationship is satisfied between the corresponding vertical column and vertical line segment, that is, the ratio of widths r=x/W in the right figure is equivalent to the ratio of expanded widths $r'=S(x'_1)/S(x'_b)$ in the left figure, where $S(t)=\int \sqrt{dx_i^2+dz_i^2}$. The corresponding vertical line segment in the left figure can be located according to this proportion relationship.

Then corresponding points on the vertical line segment are located for respective points on the vertical column. An example of a process of locating the corresponding points will be detailed below. A point on the vertical line segment of the left figure corresponding to each pixel point (x, y) on the vertical column of the right figure (the vertical column defined by $(x, y_0)$ and $(x, y_1)$) can be calculated in the following formula:

$$y'=(y+c_x)/(a_xy+b_x) \quad (6)$$

where $a_x$ represents a constant coefficient related to the vanishing point, and $b_x$ and $c_x$ represent constant coefficients related to the vanishing point and the abscissa x on the flat surface and can be derived experimentally or empirically. Assumed all the vertical line segments in the left figure intersect at a vanishing point ($x'_{vanish}$, $y'_{vanish}$), and the y coordinate of the vanishing point of the vertical columns is ∞, then $y'_{vanish}=(\infty+c_x)/(a_x\infty+b_x)=1/a_x$ and $a_x=1/y'_{vanish}$ can be derived in the formula (6). For two-dimension parallel lines, this "vanishing point" may be infinitely located, and then $a_x$ takes a value of zero, and the other two coefficients $b_x$ and $c_x$ can be derived by solving the following set of equations:

$$y'_0=(y_0+c_x)/(a_xy_0+b_x)$$

$$y'_1=(y_1+c_x)/(a_xy_1+b_x) \quad (7)$$

Therefore the y' coordinate can be calculated from the y coordinate and the x' coordinate can be calculated according to the proportion relationship of a straight line segment on the vertical line segment, i.e., $x'=x'_0+(x'_1-x'_0)(y'-y'_0)/(y'_1-y'_0)$, where the points used to calculate the x' coordinate according to the proportion relationship will not be limited to $(x_0',y_0')$ and $(x_1',y_1')$ but any point with calculated coordinates can be used. Thus the coordinates (x', y') of the point on the vertical line segment in the left figure corresponding to the point (x, y) on the vertical column in the right figure is obtained.

Finally the pixel value of the point (x, y) in the right figure can be obtained from the pixel values of neighboring points of the point (x', y') in the left figure through bilinear interpolation to thereby obtain contents of the image of the flatted pages of the book, as illustrated in FIG. 1b. A method for deriving the pixel value of any point in the image on the left will not be limited bilinear interpolation but can be any appropriate interpolation method so long as the pixel value of the point (x, y) in the right figure, e.g., tri-interpolation, B-splint interpolation, Gaussian interpolation, etc.

In summary the true width of the bent pages of the book is obtained and the pages are expanded into flat pages of the book in the image processing method according to the embodiment. The expanded width of the bent pages of the book estimated simply from the top or bottom contour on the pages of the book may not be accurate because the true shape of a bent section of the pages of the book may not be the same as the shape of the contour. In the method according to the embodiment, the true expanded lengths of the line segments in the image captured by the imaging apparatus are estimated from their lengths and summed into the expanded width of the pages of the book to thereby obtain the flatted pages of the book. After the flatted pages of the book are obtained, contents of the raw image are transformed onto the lying flat surface by locating the points on the curve surface in the originally captured image in one-to-one correspondence to those on the expanded flat surface. Since the contents of the book are presented with the real width of the book, the embodiments can present a better visual effect. Furthermore no long text line or other content information is required in the method which is a content-independent method, so a better effect can be achieved for both pictures and texts, as illustrated in FIG. 6a-6d.

It shall be noted that the mapping process of locating the corresponding points between the curve surface of the originally imaged pages of the book and the flat surface of the expanded book and the interpolation process of deriving the pixels of the corresponding points may not be performed after the geometrical distortion is removed. As illustrated in FIG. 3, the mapping and interpolation processes can be performed firstly after the perspective distortion is performed and then performed secondly between the image with the perspective distortion removed and flatting the image after the geometrical distortion is removed.

The surface of the imaged book has been taken as an example in the embodiment, but the image processing method according to the embodiment will not be limited thereto but can be also applicable to correction of any other surface so long as the surface is subject to a bending distortion upon being imaged.

Figure 7:
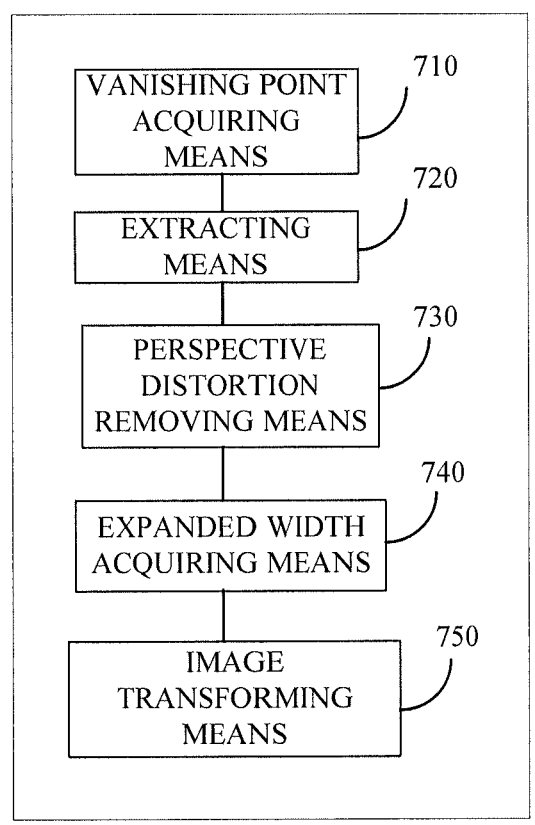
FIG. 7 illustrates a configuration block diagram of an image processing device according to another embodiment.

In correspondence to the image processing method according to the embodiment, an embodiment further provides an image processing device as illustrated in FIG. 7 which includes:

Vanishing point obtaining means 710 configured for obtaining a vanishing point on a curve surface in a two-dimension image obtained by an imaging apparatus;

Extracting means 720 configured for extracting all the straight lines between the vanishing point and the longer one of a top contour line and a bottom contour line of the curve surface by a width in a specific unit on the curve surface, the straight lines being adjacent to each other and intersecting at the vanishing point;

Perspective distortion removing means 730 configured for removing a perspective distortion of the curve surface so that the intersecting straight lines become parallel straight lines;

Expanded width obtaining means 740 configured for obtaining the lengths of the straight line segments of the straight lines between the top contour line and the bottom contour line and obtaining the true widths of the respective straight line segments in a three-dimension space and the depth increments of the respective straight line segments according the lengths, for obtaining the expanded widths of the respective straight line segments according to the true widths and the depth increments, and for summing the expanded widths of all the straight line segments into the total expanded width of the curve surface in order to transform the curve surface into a flat surface; and Image transforming means 750 configured for transforming image contents on the curve surface onto the flat surface according to a correspondence relationship between points on the curve surface and points on the flat surface.

It shall be noted that the image processing device according to the embodiment and the respective constituent components can be configured to perform processes similar to those in the embodiment of the method according to the embodiments, and therefore reference can be made to the corresponding description in the embodiment of the method for details of those aspects in the embodiment of the device which have not been detailed, and a repeated description thereof will be omitted here.

According to another embodiment, an imaging device, e.g., a scanner, etc., can be equipped with the image processing device according to the embodiment to thereby be capable of the foregoing various image processing functions.

The foregoing detailed description has been presented in the block diagrams, the flow charts and/or the embodiments to set forth a variety of implementations of the device and/or the method according to the embodiment(s). When these block diagrams, flow charts and/or embodiments involve one or more functions and/or operations, those skilled in the art shall appreciate the respective functions and/or operations in these block diagrams, flow charts and/or embodiments can be performed separately and/or collectively in a variety of hardware, software, firmware or essentially any combination thereof. In an embodiment, several aspects of the subject matter described in this specification can be embodied in an Application Specific Integrated Circuit (ASIC), a Field Programmable Gate Array (FPGA), a Digital Signal Processor (DSP) or another integrated form. However those skilled in the art shall appreciate that some aspects of the implementations described in this specification can be wholly or partially embodied in an integrated circuit in the form of one or more computer programs running on one or more computers (e.g., in the form of one or more computer programs running on one or more computer systems), in the form of one or more computer programs running on one or more processors (e.g., in the form of one or more computer programs running on one or more microprocessors), in the form of firmware or equivalently in the form of essentially any combination thereof, and those skilled in the art are capable of designing circuits for this disclosure and/or writing codes for software and/or firmware of this disclosure in light of the disclosure in this specification.

For example the respective steps in the flow chart of the process for correcting a distortion due to bending of the surface of a book and finally having contents on the surface of the book flatted as illustrated in FIG. 2 can be performed in software, firmware, hardware or any combination thereof. In the case of being performed in software or firmware, a program constituting the program can be installed from a storage medium or a network to a computer in a specialized hardware structure (e.g., a general-purpose computer 800 illustrated in FIG. 8), which can perform various functions when a variety of programs are installed thereon.

Figure 8:
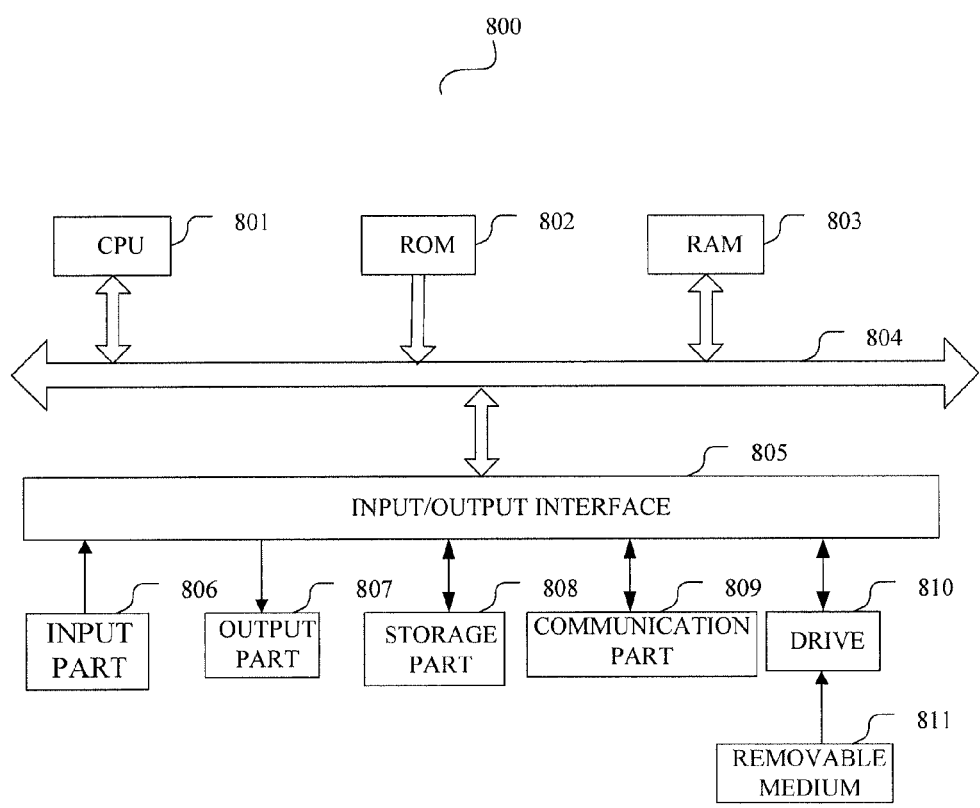
FIG. 8 illustrates a general structural diagram of a general-purpose computer system in which the image processing method according to the embodiment can be embodied.

FIG. 8 illustrates a general structural diagram of a general-purpose computer system which can serve as an information processing device performing the image processing method according to the embodiment. The computer system 800 is merely illustrative but not intended to suggest any limitation of a scope of applications or of functions of the method and device according to the embodiments. Furthermore the computer system 800 shall not be construed as relying upon or requiring any one or combination of components illustrated in the illustrative computer system 800.

In FIG. 8, a Central Processing Unit (CPU) 801 performs various processes according to a program stored in a Read Only Memory (ROM) 802 or loaded from a storage part 808 into a Random Access Memory (RAM) 803 in which data required when the CPU 801 performs the various processes is also stored as needed. The CPU 801, the ROM 802 and the RAM 803 are connected to each other via a bus 804 to which an input/output interface 805 is also connected.

The following components are also connected to the input/output interface 805: an input part 806 (including a keyboard, a mouse, etc.), an output part 807 (including a display, e.g., a Cathode Ray Tube (CRT), a Liquid Crystal Display (LCD), etc., a speaker, etc.), a storage port 808 (including a hard disk, etc.) and a communication part 809 (including a network interface card, e.g., an LAN card, a modem, etc.). The communication part 809 performs a communication process over a network, e.g., the Internet. A drive 810 is also connected to the input/output interface 805 as needed. A removable medium 811, e.g., a magnetic disk, an optical disk, an optic-magnetic disk, a semiconductor memory, etc., can be installed on the drive 810 as needed so that a computer program fetched therefrom can be installed into the storage part 808.

In the case that the foregoing series of processes are performed in software, a program constituting the software is installed from the network, e.g., the Internet, etc., or a storage medium, e.g., the removable medium 811, etc.

Those skilled in the art shall appreciate that such a storage medium will not be limited to the removable medium 811 illustrated in FIG. 8 in which the program is stored and which is distributed separately from the device to provide a user with the program. Examples of the removable medium 811 include a magnetic disk (including a Floppy Disk), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 802, the hard disk included in the storage port 808, etc., in which the program is stored and which is distributed together with the device including the same to the user.

Therefore the embodiments further propose a program product including machine readable instruction codes stored therein which can perform the foregoing image processing method according to the embodiments when being read and executed by a machine. Correspondingly the various storage mediums listed above in which the program product is embodied will also come into the scope of the embodiments.

In the foregoing description of the embodiments, a feature described and/or illustrated in an embodiment can be used identically or similarly in one or more other embodiments in combination with or in place of a feature in the other embodiment(s).

It shall be noted that the terms "include/comprise" and their variants as used in this context refer to presence of a feature, an element, a step or a component but do not preclude presence or addition of one or more other features, elements, steps or components. The terms "first", "second", etc., relating ordinal numbers will not mean any execution order or any degree of importance of features, elements, steps or components as defined with these terms but are merely intended to identify these features, elements, steps or components for the sake of clarity of the description.

Furthermore the method according to the respective embodiments will not be limited to being performed in the temporal sequence described in the specification or illustrated in the drawings but can also be performed in another temporal sequence, concurrently or separately. Therefore the sequence in which the method is performed described in the specification will not limit the scope of the embodiments.

The following annexes are also disclosed in connection with the foregoing embodiments.

Annex 1. An image processing method, including:
  obtaining a vanishing point on a curve surface in a two-dimension image obtained by an imaging apparatus;
  extracting all the straight lines between the vanishing point and the longer one of a top contour line and a bottom contour line of the curve surface by a width in a specific unit on the curve surface, the straight lines being adjacent to each other and intersecting at the vanishing point;

removing a perspective distortion of the curve surface so that the intersecting straight lines become parallel straight lines;

obtaining the lengths of straight line segments of the straight lines between the top contour line and the bottom contour line and obtaining a true width of each of the straight line segments in a three-dimension space and a depth increment of the straight line segment according to the lengths;

obtaining an expanded width of each of the straight line segments according to the true width and the depth increment;

summing the expanded widths of all the straight line segments into the total expanded width of the curve surface in order to transform the curve surface into a flat surface; and transforming image contents on the curve surface onto the flat surface according to a correspondence relationship between points on the curve surface and points on the flat surface.

Annex 2. An image processing method according to Annex 1, wherein the step of obtaining the expanded width of each of the straight line segments includes:

obtaining the expanded width of each of the straight line segments by obtaining the sum of the squares of the true width and the depth increment and then obtaining the square root for the sum of the squares.

Annex 3. An image processing method according to Annex 1 or 2, wherein the correspondence relationship between a point on the flat surface and a corresponding point on the curve surface is represented with:

$$y'=(y+c_x)/(a_x y+b_x)$$

$$x'=x'_0+(x'_1-x'_0)(y'-y'_0)/(y'_1-y'_0)$$

wherein $a_x$ represents a constant related to the vanishing point of the straight line segments, $b_x$ and $c_x$ represent constants related to the vanishing point of the straight line segments and x, x and y are the abscissa and the ordinate respectively of the point on the flat surface, x' and y' are the abscissa and the ordinate respectively of the corresponding point on the curve surface, $x'_0$, $y'_0$ and $x'_1$, $y'_1$ are the abscissa and the ordinate respectively of any point on a straight line segment on the curve surface corresponding to a straight line segment on which the coordinates (x,y) are located on the flat surface.

Annex 4. An image processing method according to any one of Annexes 1 to 3, wherein the depth increment is the difference between the distance from the straight line segment to the focus of a lens of the imaging apparatus and the distance from a straight line segment adjoining the straight line segment to the focus of the lens of the imaging apparatus.

Annex 5. An image processing method according to any one of Annexes 1 to 3, wherein the depth increment is the difference between the distances from two sides of the straight line segment in the length direction to the focus of a lens of the imaging apparatus.

Annex 6. An image processing method according to any one of Annexes 1 to 5, wherein the vanishing point is obtained from corner points on the top contour line and the bottom contour line of the curve surface.

Annex 7. An image processing method according to any one of Annexes 1 to 6, wherein the curve surface is the surface of a book in the form of a two-dimension image obtained by the imaging apparatus.

Annex 8. An image processing device, including:

vanishing point obtaining means configured for obtaining a vanishing point on a curve surface in a two-dimension image obtained by an imaging apparatus;

extracting means configured for extracting all straight lines between the vanishing point and the longer one of a top contour line and a bottom contour line of the curve surface by a width in a specific unit on the curve surface, the straight lines being adjacent to each other and intersecting at the vanishing point;

perspective distortion removing means configured for removing a perspective distortion of the curve surface so that the intersecting straight lines become parallel straight lines;

expanded width obtaining means configured for obtaining the lengths of the straight line segments of the straight lines between the top contour line and the bottom contour line and obtaining the true widths of the respective straight line segments in a three-dimension space and the depth increments of the respective straight line segments according the lengths, for obtaining an expanded widths of the respective straight line segments according to the true widths and the depth increments, and for summing the expanded widths of all the straight line segments into the total expanded width of the curve surface in order to transform the curve surface into a flat surface; and image transforming means configured for transforming image contents on the curve surface onto the flat surface according to a correspondence relationship between points on the curve surface and points on the flat surface.

Annex 9. An image processing device according to Annex 8, wherein the expanded width obtaining means is configured for obtaining the expanded width of each of the straight line segments by obtaining the sum of the squares of the true width and the depth increment and then obtaining the square root for the sum of squares.

Annex 10. An image processing device according to Annex 8 or 9, wherein the correspondence relationship between a point on the flat surface and a corresponding point on the curve surface is represented with:

$$y'=(y+c_x)/(a_x y+b_x)$$

$$x'=x'_0+(x'_1-x'_0)(y'-y'_0)/(y'_1-y'_1)$$

wherein $a_x$ represents a constant related to the vanishing point of the straight line segments, $b_x$ and $c_x$ represent constants related to the vanishing point of the straight line segments and x, x and y are the abscissa and the ordinate respectively of the point on the flat surface, x' and y' are the abscissa and the ordinate respectively of the corresponding point on the curve surface, $x'_0$, $y'_0$ and $x'_1$, $y'_1$ are the abscissa and the ordinate respectively of any point on a straight line segment on the curve surface corresponding to a straight line segment on which the coordinates (x,y) are located on the flat surface.

Annex 11. An image processing device according to any one of Annexes 8 to 10, wherein the depth increment is the difference between the distance from the straight line segment to the focus for a lens of the imaging apparatus and the distance from a straight line segment adjoining the straight line segment to the focus for the lens of the imaging apparatus.

Annex 12. An image processing device according to any one of Annexes 8 to 10, wherein the depth increment is the difference between the distances from two sides of the straight line segment in the length direction to the focus for a lens of the imaging apparatus.

Annex 13. An image processing device according to any one of Annexes 8 to 12, wherein the vanishing point acquiring means obtains the vanishing point from corner points on the top contour line and the bottom contour line of the curve surface.

Annex 14. An image processing device according to any one of Annexes 8 to 13, wherein the curve surface is the surface of a book in the form of a two-dimension image obtained by the imaging apparatus.

Annex 15. A scanner, including the image processing device according to any one of Annexes 8 to 14.

Annex 16. A computer program, which upon running on a computer performs the method according to any one of Annexes 1 to 7.

Annex 17. A storage medium, including a computer program stored thereon which upon running on a computer performs the method according to any one of Annexes 1 to 7.

Although the embodiments have been disclosed above in the description of the embodiments, it shall be appreciated that those skilled in the art can devise various modifications, adaptations or equivalents to the embodiments without departing from the spirit and scope of the embodiments. These modifications, adaptations or equivalents shall also be construed as coming into the scope of the embodiments.

The invention claimed is:

1. An image processing method, comprising:
obtaining a vanishing point on a curved surface in a two-dimension image obtained by an imaging apparatus;
extracting all the straight lines between the vanishing point and a longer one of a top contour line and a bottom contour line of the curved surface by a width in a specific unit on the curved surface, the straight lines being adjacent to each other and intersecting at the vanishing point;
removing a perspective distortion of the curved surface so that the intersecting straight lines become parallel straight lines;
obtaining lengths of straight line segments of the straight lines between the top contour line and the bottom contour line and obtaining a true width of each of the straight line segments in a three-dimension space and a depth increment of the straight line segment according to the lengths;
obtaining an expanded width of each of the straight line segments according to the true width and the depth increment;
summing the expanded widths of all the straight line segments into the total expanded width of the curved surface in order to transform the curved surface into a flat surface; and
transforming image contents on the curved surface onto a flat surface according to a correspondence relationship between points on the curved surface and points on the flat surface.

2. The method according to claim 1, wherein the step of obtaining the expanded width of each of the straight line segments comprises:
obtaining the expanded width of each of the straight line segments by obtaining a sum of squares of the true width and the depth increment and then obtaining a square root for the sum of the squares.

3. The image processing method according to claim 1, wherein the correspondence relationship between a point on the flat surface and a corresponding point on the curved surface is represented by:

$$y'=(y+c_x)/(a_x y+b_x)$$

$$x'=x'_0+(x'-x'_0)(y'-y'_0)/(y'_1-y'_0)$$

wherein $a_x$ represents a constant related to the vanishing point of the straight line segments, $b_x$ and $c_x$ represent constants related to the vanishing point of the straight line segments and x, x and y are the abscissa and the ordinate respectively of the point on the flat surface, x' and y' are the abscissa and the ordinate respectively of the corresponding point on the curved surface, $x'_0$, $y'_0$ and $x'_1$, $y'_1$ are the abscissa and the ordinate respectively of any point on a straight line segment on the curved surface corresponding to the straight line segment on which the coordinates (x,y) are located on the flat surface.

4. The image processing method according to claim 1, wherein the depth increment is the difference between a first distance from the straight line segment to a focus of a lens of the imaging apparatus and a second distance from a straight line segment adjoining the straight line segment to the focus of the lens of the imaging apparatus.

5. The image processing method according to claim 1, wherein the depth increment is a difference between distances from two sides of the straight line segment in a length direction to a focus of a lens of the imaging apparatus.

6. The image processing method according to claim 1, wherein the vanishing point is obtained from corner points on the top contour line and the bottom contour line of the curved surface.

7. The image processing method according to claim 1, wherein the curved surface is a book surface of a book in the form of a two-dimension image obtained by the imaging apparatus.

8. An image processing device, comprising:
vanishing point obtaining means configured for obtaining a vanishing point on a curved surface in a two-dimension image obtained by an imaging apparatus;
extracting means configured for extracting all straight lines between the vanishing point and a longer one of a top contour line and a bottom contour line of the curved surface by a width in a specific unit on the curved surface, the straight lines being adjacent to each other and intersecting at the vanishing point;
perspective distortion removing means configured for removing a perspective distortion of the curved surface so that intersecting straight lines become parallel straight lines;
expanded width obtaining means configured for obtaining lengths of straight line segments of the straight lines between the top contour line and the bottom contour line and obtaining true widths of the respective straight line segments in a three-dimension space and depth increments of the respective straight line segments according the lengths, for obtaining expanded widths of the respective straight line segments according to the true widths and the depth increments, and for summing the expanded widths of all the straight line segments into a total expanded width of the curved surface to transform the curved surface into a flat surface; and
image transforming means configured for transforming image contents on the curved surface onto the flat surface according to a correspondence relationship between points on the curved surface and points on the flat surface.

9. The image processing device according to claim 8, wherein the expanded width obtaining means is configured for obtaining the expanded width of each of the straight line segments by obtaining a sum of squares of the true width and the depth increment and then obtaining a square root for the sum of squares.

10. An image processing device according to claim 8, wherein the correspondence relationship between a point on the flat surface and a corresponding point on the curved surface is represented with:

$$y'=(y+c_x)/(a_x y+b_x)$$

$$x'=x'_0+(x'_1-x'_0)(y'-y'_0)/(y'_1-y'_0)$$

wherein $a_x$ represents a constant related to the vanishing point of the straight line segments, $b_x$ and $c_x$ represent constants related to the vanishing point of the straight line segments and x, x and y are the abscissa and the ordinate respectively of the point on the flat surface, x' and y' are the abscissa and the ordinate respectively of the corresponding point on the curved surface, $x'_0$, $y'_0$ and $x'_1$, $y'_1$ are the abscissa and the ordinate respectively of any point on a straight line segment on the curved surface corresponding to a straight line segment on which the coordinates (x,y) are located on the flat surface.

11. An image processing device according to claim 8, wherein the depth increment is a difference between a first distance from the straight line segment to the focus for a lens of the imaging apparatus and a second distance from a straight line segment adjoining the straight line segment to the focus for the lens of the imaging apparatus.

12. An image processing device according to claim 8, wherein the depth increment is a difference between distances from two sides of the straight line segment in a length direction to a focus for a lens of the imaging apparatus.

13. An image processing device according to claim 8, wherein the vanishing point acquiring means obtains the vanishing point from corner points on the top contour line and the bottom contour line of the curved surface.

14. An image processing device according to claim 8, wherein the curved surface is a book surface of a book in the form of a two-dimension image obtained by the imaging apparatus.

15. A scanner, comprising the image processing device according to claim 8.

16. A non-transitory storage medium, including a computer program stored thereon which upon running on a computer performs the method according to claim 1.

* * * * *

UNITED STATES PATENT AND TRADEMARK OFFICE
CERTIFICATE OF CORRECTION

PATENT NO. : 8,717,632 B2  
APPLICATION NO. : 13/471977  
DATED : May 6, 2014  
INVENTOR(S) : Zheng et al.

Page 1 of 1

It is certified that error appears in the above-identified patent and that said Letters Patent is hereby corrected as shown below:

In the Claims

Column 14, Line 6, in Claim 3, delete "$x'=x'_0+(x'-x'_0)(y'-y'_0)/(y'-y'_0)$" and insert -- $x'=x'_0+(x'_1-x'_0)(y'-y'_0)/(y'_1-y'_0)$ --, therefor.

Signed and Sealed this  
Nineteenth Day of August, 2014

Michelle K. Lee  
*Deputy Director of the United States Patent and Trademark Office*